INVENTOR.
CHARLES E. BRANICK
BY
Merchant, Merchant & Gould
ATTORNEYS

Dec. 17, 1963

C. E. BRANICK 3,114,454

WRAPPER FOR PNEUMATIC TIRE CASINGS
AND METHOD OF FORMING SAME

Filed Nov. 24, 1961

INVENTOR.
CHARLES E. BRANICK
BY
Merchant, Merchant & Gould
ATTORNEYS

United States Patent Office 3,114,454
Patented Dec. 17, 1963
:::

3,114,454
WRAPPER FOR PNEUMATIC TIRE CASINGS AND METHOD OF FORMING SAME
Charles E. Branick, % Branick Manufacturing Co., Box 1937, Fargo, N. Dak.
Filed Nov. 24, 1961, Ser. No. 154,568
4 Claims. (Cl. 206—46)

My invention relates generally to the art of wrapping pneumatic tire casings and more specifically to a novel wrapper for such casings and method of producing same.

More specifically, my present invention is in the nature of an improvement upon my copending application Serial No. 154,566, filed November 24, 1961, and entitled "Pre-Shaped Wrapper for Pneumatic Tire Casings and Method of Forming Same." In the wrapping of pneumatic tires with the wrapper of said copending application, difficulty has been experienced in bringing about overlapping relationship between the sealing flaps when an attempt is made to in-fold same over the beads B of a tire casing A for the purposes of bringing about a sealing engagement between said flaps. To overcome this objectionable feature, I have found that the wrapper should be pre-formed in a manner whereby the sealing flap forming portions of the wrapper are caused to be pre-formed in a manner to project axially outwardly in opposite directions to define generally cylindrical sealing flaps of a diameter corresponding approximately to the opening defined by the beads of the tire casing. It is to a wrapper so pre-formed and the method of pre-forming same that this application is directed.

Referring to the drawings wherein like characters indicate like parts throughout the several views:

FIG. 4 is a sectional view taken on the line 4—4 of FIG. 1;

Referring with greater particularity to the drawings, the numeral 1 indicates in its entirety a machine capable of producing in volume tire wrappers of the character in question and, for the purpose of this application, incorporates pretty much the structure of my copending application Serial No. 9,525, filed February 18, 1960 and entitled "Method of and Apparatus for Forming Wrappers for Articles of Annular Shape."

Figure 1:
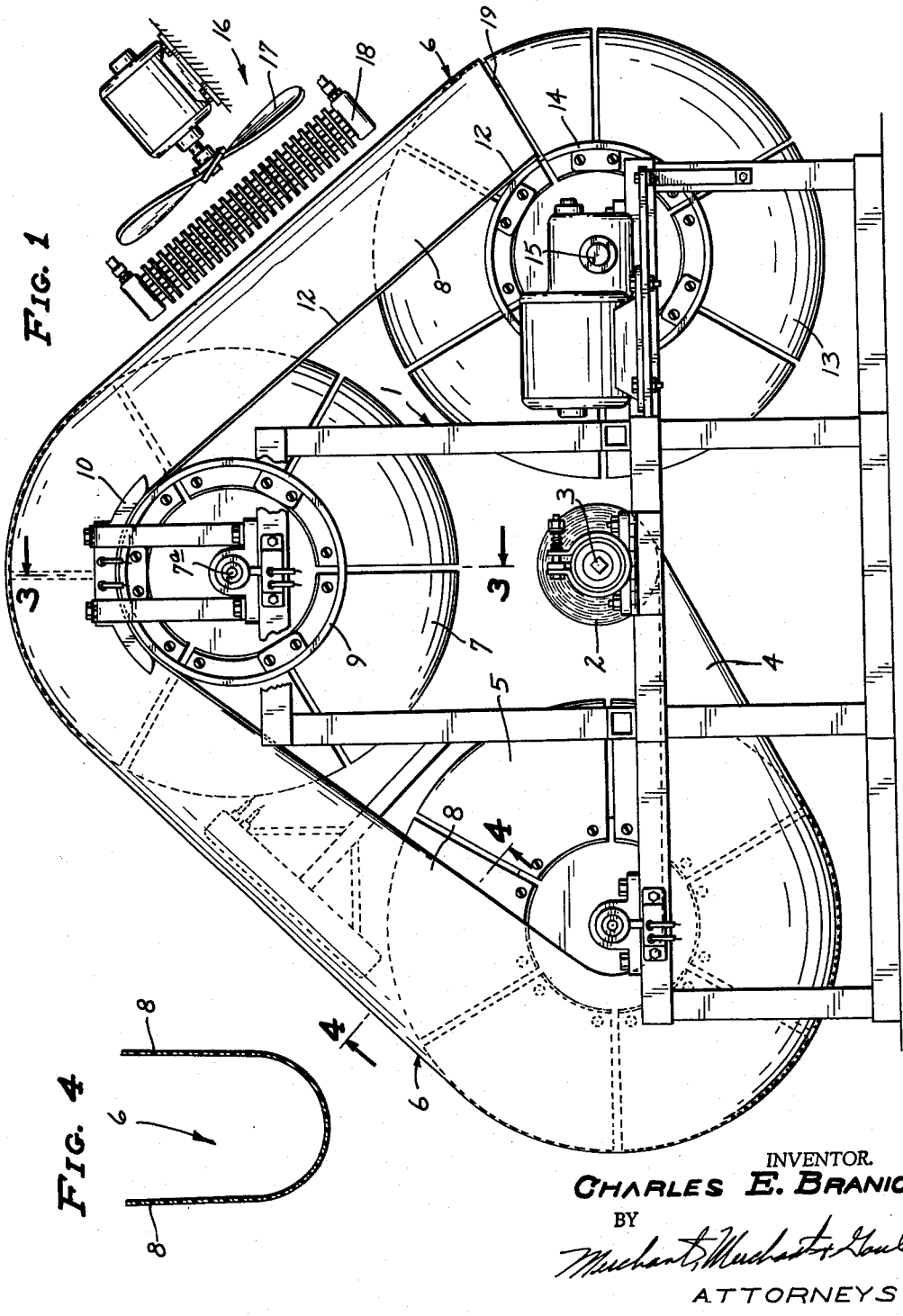
FIG. 1 is a view in side elevation of a machine of the type utilizable in the forming of my novel wrappers.
Figure 2:
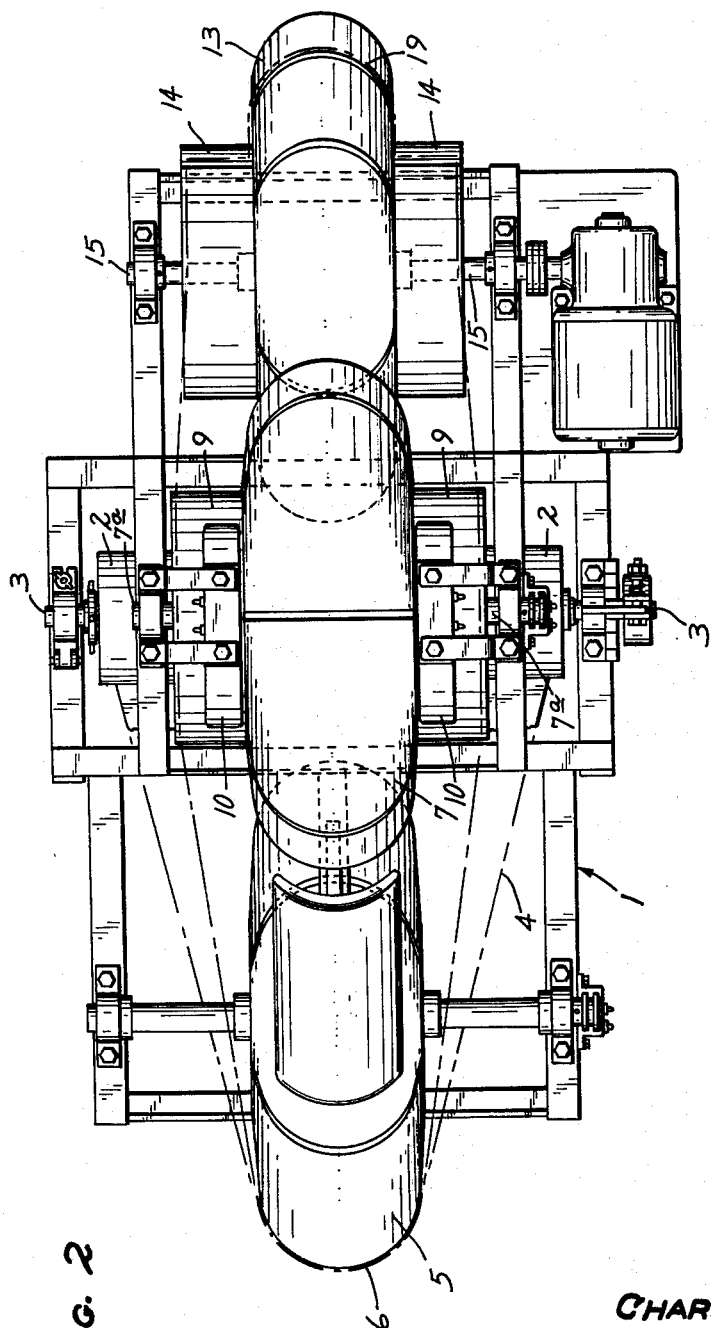
FIG. 2 is a view in top plan of the structure of FIG. 1, some parts thereof being broken away.
Figure 3:
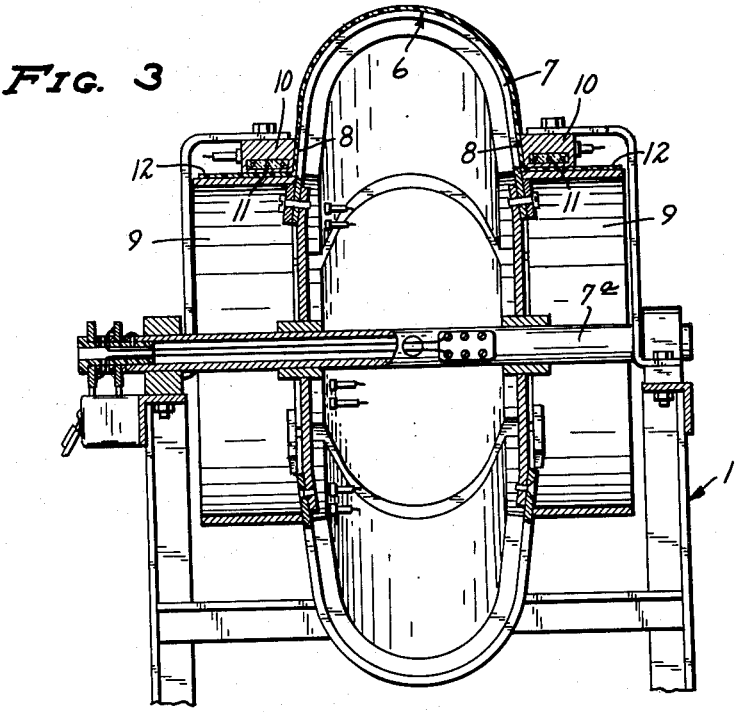
FIG. 3 is a fragmentary sectional view taken on the line 3—3 of FIG. 1, on a slightly enlarged scale.

As shown particularly in FIG. 1, a roll 2 of suitable thermoplastic sheet material, preferably transparent, such as Velon Film manufactured by Firestone Tire and Rubber Company of Akron, Ohio, is journalled for unwinding movements on a horizontal axis 3 whereby to provide a ribbon-like strip 4 of desired width for wrapping a tire of a given size. The strip 4 is first run over a forming roll 5 wherein, as shown in FIG. 4, a cross-sectionally channel-shape is imparted thereto. It might here be stated that the channel 6 formed in the strip 4 is of greater radial depth than the cross-sectional depth of a pneumatic tire casing to be wrapped therein.

As the channel-shaped strip 4 approaches the second forming roll 7, suitably journalled as at 7a, the generally parallel opposite side edge portions 8 thereof are flared outwardly in opposite directions by any suitable means, not shown, before being caused to engage axially extended cylindrical forming elements 9. A permanent set is imparted to these marginal edge portions 8 by arcuate shoes 10 which may be suitably heated such as by electrical resistance elements 11. As shown, the shoes 10 closely overlie the peripheral surface of the cylindrical forming elements 9 during rotation thereof.

At this stage in the forming of my novel tire wrapper the channel 6, formed intermediate the opposite side edges, has a radial depth corresponding approximately to the radial depth of a tire A to be wrapped therein; whereas the sealing flaps 12 on opposite sides project in opposite directions in a common plane. The required heat for the forming of the strip 4 on forming rolls 5, 7 may be derived from any suitable source, such as by spaced heat lamps or by heating elements within said forming rolls.

While it is appreciated that to some extent an arcuate form, of necessity, is imparted to the strip 4 by the forming rolls 5, 7, final circular shape is not imparted to the strip until the same is wrapped about the forming roll 13. Forming roll 13 is likewise provided with generally cylindrical forming elements 14 which are fast thereon and rotate co-axially therewith upon the shaft 15. In order to facilitate cooling of the heated strip 4, I provide suitable cooling apparatus identified in its entirety by the numeral 16 and including a motor equipped fan 17 which directs a blast of air through a grid-like cooling element 18.

Figure 5:
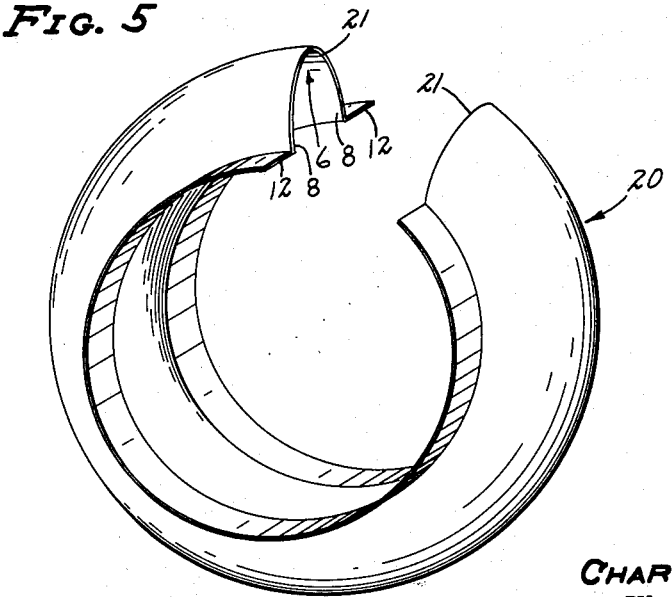
FIG. 5 is a view in perspective of one of my novel tire wrappers.

After a suitable number of convolutions of channel-shape strip 4 with sealing flaps 12 thereon, now in a generally cylindrical shape, have been wound about the forming roll 13 and said convolutions allowed to cool sufficiently so as to impart a permanent set thereto, a knife or other cutting tool is drawn through one of the radially extended transverse slits 19 so as to produce a plurality of individual wrappers 20, as shown in FIG. 5. Each of the wrappers 20 has an overall cross-sectional dimension slightly greater than that of a tire casing A to be wrapped therein. This arrangement permits the opposite end portions 21 to be overlapped slightly as the wrapper 20 is stretched taut about the tire casing A. In practice, these overlapped edges 21 are suitably heat sealed so as to retain the wrapper 20 taut during the final stages of wrapping, hereinafter immediately to be described.

Figure 6:
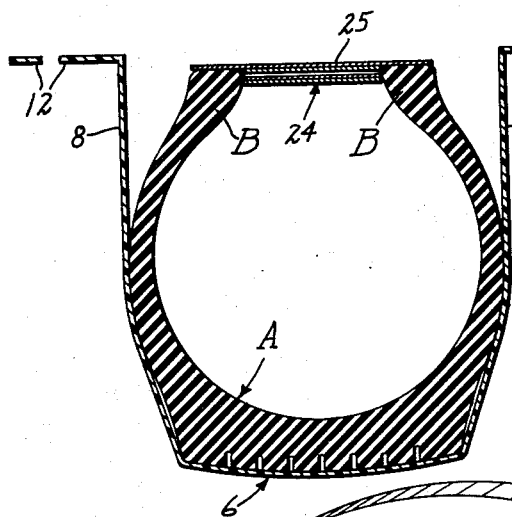
FIG. 6 is a view in transverse section of a portion of a pneumatic tire casing illustrating a step in the use of the wrapper shown in FIG. 4.

As above indicated, the radially inwardly opening channel 6 is of a radial depth corresponding approximately to that of the tire casing A, whereas the cylindrical sealing flap portions 12, which now project axially outwardly in opposite directions, are approximately of the diameter of the opening 22 defined by the beads B of the tire casing A. This arrangement is well illustrated in FIG. 6.

Figure 7:
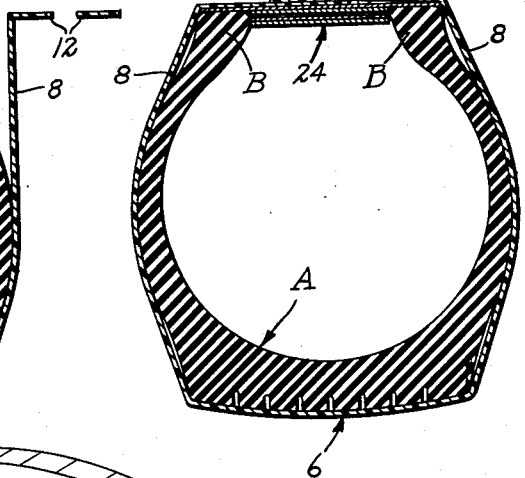
FIG. 7 is a view similar to FIG. 5 but showing the final steps in the wrapping of a tire casing.
Figure 8:
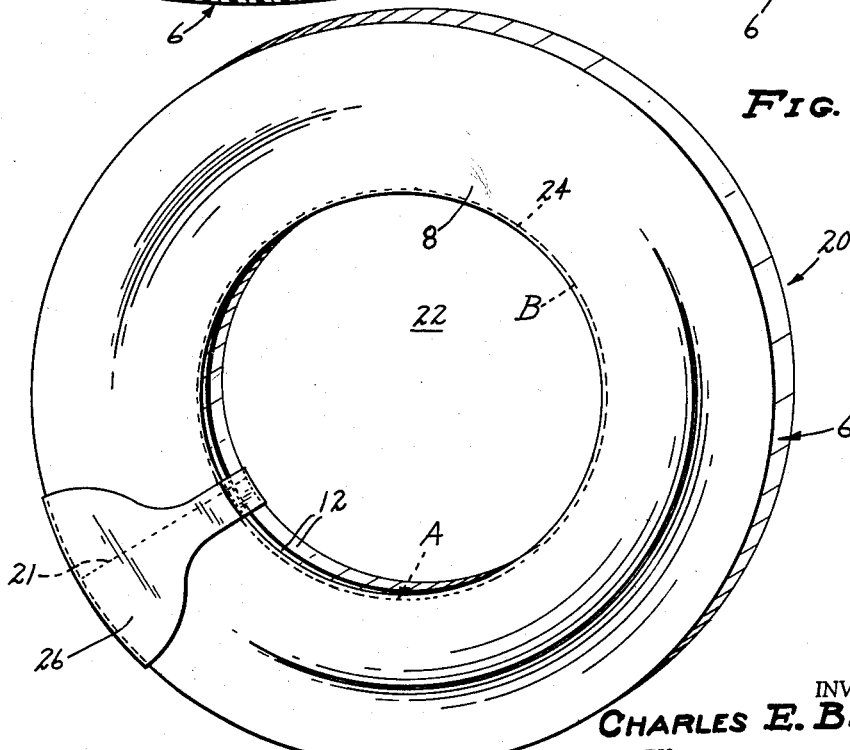
FIG. 8 is a view in perspective showing a casing with my novel wrapper installed thereon.

The final step in the wrapping of the tire casing A is shown in FIG. 7 wherein the sealing flaps 12 are in-folded over the beads B of the tire A in overlapping concentric relationship. A suitably heated sealing tool 23 is then brought to bear against the overlapped flap portions 12 to seal same together. Preferably a suitable bead spacing band 24, of the type disclosed and claimed in my copending application Serial No. 142,810, filed October 4, 1961 now Patent Number 3,044,609 issued July 17, 1962 and entitled "Tire Bead Spacing and Supporting Element" is placed between the beads B of the tire casing A immediately prior to the in-folding and sealing of the flaps 12, in which case the flat cylindrical surface 25 of the spacer band 24 provides an excellent base of resistance for the heating tool 23 in the sealing operation.

If desired and to impart a still more finished appearance to the tire casing A wrapped in my novel wrapper 20, a band 26 is suitably applied around the tire casing so as to conceal the overlapped edges 21.

My invention has been thoroughly tested and found to be completely satisfactory for the accomplishment of the above objects, and while I have shown a preferred embodiment thereof, I wish it to be understood that same may be capable of modification without departure from the scope and spirit of the appended claims.

What I claim is:

1. A pre-shaped wrapper for bead-equipped pneumatic tire casings,
   (a) said wrapper being formed from thermoplastic sheet material and comprising
   (b) an axially elongated split ring having a maximum diameter approximately that of a tire casing to be wrapped therein,
   (c) said ring having a cross-sectional contour which defines a radially inwardly opening tire casing receiving channel centrally of its opposite edges,
   (d) the radial depth of said channel corresponding approximately to that of said tire casing,
   (e) opposite circumferential edge portions of said wrapper defining axially outwardly projecting generally cylindrical sealing flaps having diameters corresponding approximately to the opening defined by the beads of said tire casing.

2. A pre-shaped wrapper for bead-equipped pneumatic tire casings,
   (a) said wrapper being formed from transparent thermoplastic sheet material and comprising
   (b) an axially elongated split ring having a maximum diameter slightly greater than that of the tire casing to be wrapped therein,
   (c) said ring having a cross-sectional contour which defines a radially inwardly opening tire casing receiving channel centrally of its opposite edges,
   (d) the radial depth of said channel corresponding approximately to that of said tire casing,
   (e) opposite circumferential edge portions of said wrapper defining axially outwardly projecting generally cylindrical sealing flaps having diameters corresponding approximately to the opening defined by the beads of said tire casing.

3. The method of pre-forming a wrapper for bead-equipped pneumatic tire casings of a given size, said method comprising:
   (a) forming a ribbon-like strip of thermoplastic sheet material to provide a split ring
   (b) having a maximum diameter approximately that of said tire and
   (c) defining a continuous radially inwardly opening tire-receiving channel the radial depth of which is greater than that of said tire casing,
   (d) and finally causing the radially inner edge portions of said ring to project axially outwardly in opposite directions to produce generally cylindrical sealing flaps of a diameter corresponding generally to the opening defined by the beads of said tire casing.

4. The method of pre-forming a wrapper for bead-equipped pneumatic tire casings of a given size, said method comprising:
   (a) forming a ribbon-like strip of transparent thermoplastic material to provide a split ring
   (b) having an overall circumferential dimension slightly greater than that of said tire,
   (c) and defining a continuous radially inwardly opening tire-receiving channel the radial depth of which is greater than that of said tire casing,
   (d) and finally causing the radially inner edge portions of said ring to project axially outwardly in opposite directions to produce generally cylindrical sealing flaps of a diameter corresponding generally to the opening defined by the beads of said tire casing.

References Cited in the file of this patent

UNITED STATES PATENTS

| | | |
|---|---|---|
| 1,500,472 | Scherner | July 8, 1924 |
| 2,383,230 | Voke | Aug. 21, 1945 |
| 2,719,100 | Banigan | Sept. 27, 1955 |

FOREIGN PATENTS

| | | |
|---|---|---|
| 231,207 | Australia | Oct. 31, 1960 |